United States Patent [19]

Loizeau et al.

[11] 4,433,770

[45] Feb. 28, 1984

[54] TORSIONAL DAMPERS

[75] Inventors: Pierre Loizeau, Ville D'Avray; Roger Carmillet, Paris, both of France

[73] Assignee: Valeo, Paris, France

[21] Appl. No.: 324,843

[22] Filed: Nov. 25, 1981

[30] Foreign Application Priority Data

Dec. 2, 1980 [FR] France ................. 80 25527

[51] Int. Cl.³ .............................. F16D 3/14
[52] U.S. Cl. ...................... 192/106.2; 192/106.1; 192/70.17; 464/81; 464/68
[58] Field of Search .................. 192/55, 70.17, 106.1, 192/106.2; 464/68, 66, 81

[56] References Cited

U.S. PATENT DOCUMENTS 2,100,362 10/1937 Stahle ........................ 192/70.18

FOREIGN PATENT DOCUMENTS

| | | |
|---|---|---|
| 2242606 | 8/1973 | France . |
| 2270491 | 4/1974 | France . |
| 2268994 | 4/1974 | France . |
| 2282577 | 8/1974 | France . |
| 2449828 | 2/1979 | France . |
| 19525 | 11/1980 | France . |
| 752668 | 4/1975 | South Africa . |
| 2040398 | 8/1980 | United Kingdom ............ 192/106.2 |

*Primary Examiner*—Rodney H. Bonck
*Assistant Examiner*—James J. Merek
*Attorney, Agent, or Firm*—Charles E. Brown

[57] ABSTRACT

A torsional damper suitable for use in a friction clutch plate for an automotive vehicle comprises a hub and a disk mounted so as to rotate relative to one another against the action of springs. An intermediate member responsive to centrifugal force moves reversibly between a standby position and an operative position, in order to modify the operating characteristics of the damper. The intermediate member modifies these characteristics in its standby position, and can occupy either of two operative positions, in one of which it has no effect on and in the other of which it also modifies the aforementioned operating characteristics.

10 Claims, 9 Drawing Figures

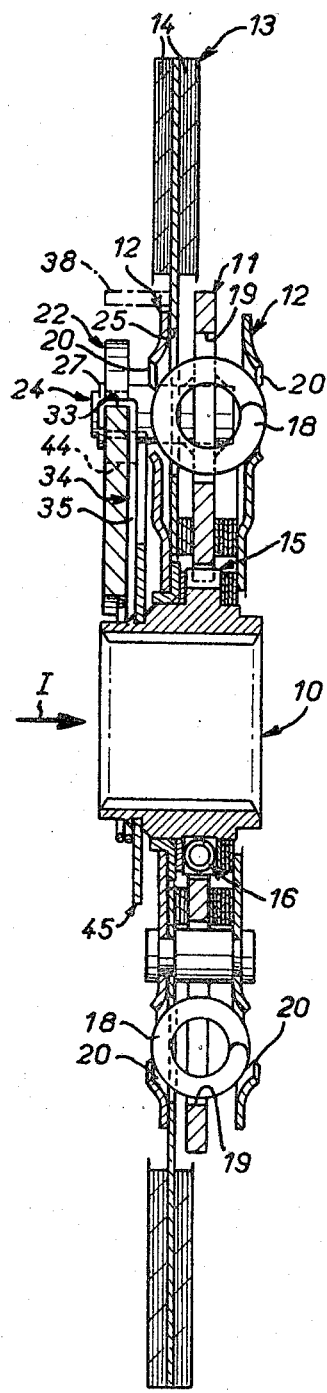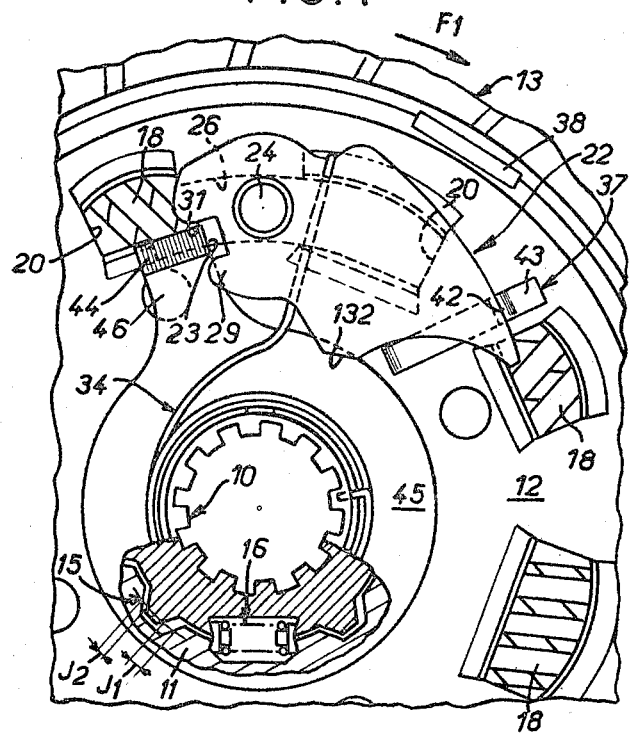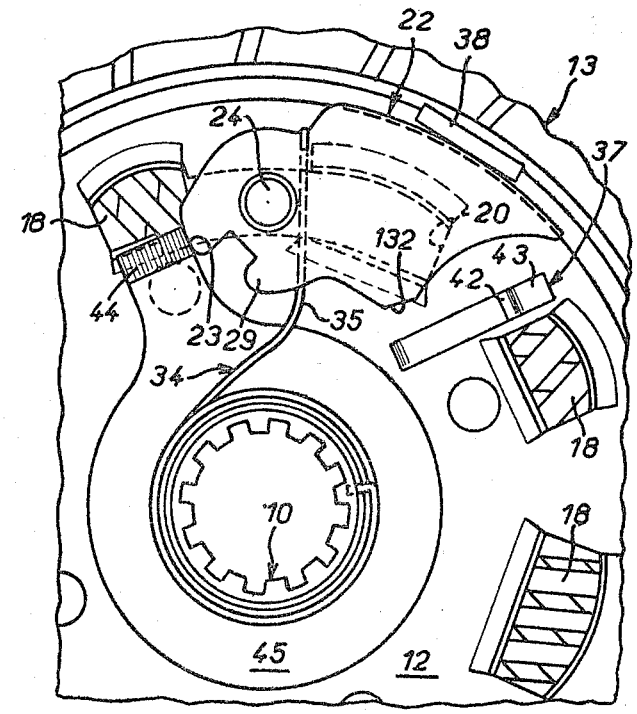

TORSIONAL DAMPERS

BACKGROUND OF THE INVENTION

1. Field of the Invention

The present invention concerns a torsional damper comprising at least two coaxial parts mounted to rotate relative to one another within a defined range of relative angular movement and circumferentially acting elastic means between said parts resisting such relative angular movement.

2. Description of the Prior Art

This type of torsional damper is normally incorporated in the design of a friction clutch plate, particularly for automotive vehicles, in which one of the rotatable parts carries a friction disk designed to rotate with a first shaft, in practice a driving shaft and the motor output shaft in the case of an automotive vehicle, whereas another of said rotatable parts is carried on a hub designed to rotate with a second shaft, in practice a driven shaft and the gearbox input shaft in the case of an automotive vehicle.

This type of device is used to permit regulated transmission of rotational torque applied to one of its rotatable parts where the other is itself subject to a rotational torque. It is thereby able to filter vibrations which may arise at any point in the kinematic system in which it is incorporated, extending from the motor to the driven road wheels in the case of an automotive vehicle.

It is also known that it is advantageous in at least some applications, especially those relating to friction clutches for automotive vehicles, for the torque transmitted between the rotatable parts to remain low at low values of relative angular displacement therebetween.

This arrangement implies the use of circumferentially acting elastic means of relatively low stiffness for low values of torque, and provides for eliminating gearbox noise at the "dead point", with the vehicle stationary, especially when warmed up.

It would appear that to some extent at least it is desirable, from this point of view, that the range of relative angular movement during which these elastic means of relatively low stiffness act should be as extensive as possible.

These elastic means evidently saturate quickly, however, at a low value of torque.

For example, when a vehicle is in motion with the clutch engaged, if the pressure exerted on the accelerator to secure operation with increasing torque is momentarily released, so that the torque between the two rotatable parts constituting the friction clutch of the vehicle changes direction and operation is then with decreasing torque, then one of the rotatable parts immediately moves to another position relative to the other.

This movement corresponds to the taking up of the play between the two rotatable parts in question due to saturation of the elastic means of relatively low stiffness acting between them, and occurs first in one direction, on releasing the pressure on the accelerator, then in the other direction when the accelerator is again pressed.

It is accompanied by a two-fold effect which increases with the extent of the corresponding range of relative angular movement and is inversely proportional to the gear ratio selected.

The first effect is a noise, rather like a double slap and commonly referred to as a "clunk".

There is then an oscillation effect affecting the whole of the vehicle.

For similar reasons, this "clunk" occurs also on changing gear.

In fact, it occurs each time the torque on the shaft driving the gearbox begins to increase again.

Thus it also occurs with the vehicle at rest, for low rotational speeds of the friction clutch, when the accelerator is released and/or pressed.

In French Patent Application No. 79 04719 filed Feb. 23, 1979, now French Pat. No. 2,449,828 published Sept. 19, 1980, and from which priority is claimed in U.S. application Ser. No. 123,458 filed Feb. 21, 1980, it is proposed to equip a torsional damper of this type, specifically a friction clutch plate with a damper type hub, with at least one intermediate member which is responsive to centrifugal force and moves against the action of return means. For a first range of rotational speeds of the damper assembly it moves reversibly between a standby position, corresponding to relatively low rotational speeds and in which it is inoperative, and, beyond a defined rotational speed conditioned by the aforementioned return means, an operative position which therefore corresponds to rotational speeds higher than the preceding speeds and in which it bears circumferentially on one of said parts, either directly or indirectly, to modify the operating chacteristics of the damper for at least part of the range of relative angular movement.

According to the disclosure of this French Patent, for a torsional damper with only two rotating parts the intermediate member may, for example, when in its operative position provide a circumferential bearing surface for at least one of the circumferentially acting elastic means between the two rotatable parts, sufficient to secure the required modification of the operating characteristics of the damper. In practice, the elastic means of relatively low stiffness are then prevented from acting alone for low values of torque.

In a variant for a torsional damper comprising three rotatable parts the intermediate member in its operative position provides positive circumferential bearing engagement for two of said rotatable parts, one on the other, in practice the first two to come into action. Thus the circumferentially acting elastic means disposed between them, in practice elastic means of relatively low stiffness, are disabled so that the operating characteristics of the damper are modified.

In this French Patent the intermediate member remains in its standby position to a relatively high rotational speed of the damper assembly, of the order of 900 to 1 100 revolutions per minute, corresponding to the maximum motor idling speed. In this standby position the intermediate member permits the circumferentially acting elastic means which it controls to act freely so as to achieve the required filtering of dead point noise, and it is only at higher rotational speeds that, under the effect of centrifugal force, it moves to its operative position and so modifies the operating characteristics of the damper.

This arrangement is perfectly suitable for eliminating the "clunk" noise when in motion and the normal oscillatory movement observed on releasing pressure on the accelerator.

It is insufficient, however, to eliminate the "clunk" noise with the vehicle stopped, which occurs at rotational speeds of the clutch assembly below those for which filtering of the dead point noise must be provided.

The objective of the present invention is to provide an intermediate member which is able to eliminate this "clunk" noise with the vehicle stopped.

SUMMARY OF THE INVENTION

The invention consists in a torsional damper such as a friction clutch plate, comprising at least two coaxial parts mounted to rotate relative to one another within a defined range of relative angular movement, elastic means between said parts acting circumferentially over at least part of said defined range of relative angular movement so as to resist same, at least one intermediate member responsive to centrifugal force by modifying the operating characteristics of the damper over at least part of said range of relative angular movement through its reversible movement against the action of return means between a standby position, which it occupies for a first range of relatively low rotational speeds of the damper assembly, and at least one operative position, which it occupies at relatively high rotational speeds of the damper assembly, said intermediate member modifying the operating characteristics of the damper in said standby position and having no effect thereon in the or each of said operative positions.

Thus it is in the standby position of the intermediate member that the elastic means of relatively low stiffness are prevented from acting alone or at all, this action extending over a range of rotational speeds of the damper assembly from zero to a defined value.

It is thus able to eliminate the "clunk" noise with the vehicle stopped.

At the final rotational speed in question, which may be of the order of 500 to 600 revolutions per minute, for example, it releases the circumferentially acting elastic means concerned, so as to enable same to operate to the full extent of their capability to filter dead point noise.

It will be appreciated that with this type of intermediate member may be associated an independent intermediate member of the type described in French Patent Application No. 79 04179 referred to hereinabove to eliminate the "clunk" noise when the vehicle is in motion and the oscillation occurring on releasing the accelerator.

In accordance with another feature of the invention, the intermediate member is rotatable and the damper further comprises a retractable stop in the path of rotational movement of said member for temporarily retaining same so that it may occupy either of two alternative operative positions, one of which is an intermediate position corresponding to a second range of rotational speeds of the damper assembly higher than those of said first range and in which said intermediate member bears on said retractable stop and has no effect on the operating characteristics of the damper, and the other of which is a terminal position beyond said retractable stop corresponding to a third range of rotational speeds of the damper assembly higher than those of said second range and in which said intermediate member modifies the operating characteristics of the damper.

Thus in accordance with the invention the same intermediate member may be used to eliminate both the "clunk" noise with the vehicle stopped and, beyond the range of rotational speeds corresponding to the area in which dead point noise is filtered, the "clunk" noise with the vehicle in motion and the oscillation occurring on releasing the accelerator.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 2 is an axial cross-section on the line II—II in FIG. 1.

FIGS. 4 and 5 repeat part of FIG. 1, partially cut away in the case of FIG. 4, and show two separate phases in the operation of the torsional damper in accordance with the invention, during the rotation thereof.

DESCRIPTION OF THE PREFERRED EMBODIMENTS

Figure 1:
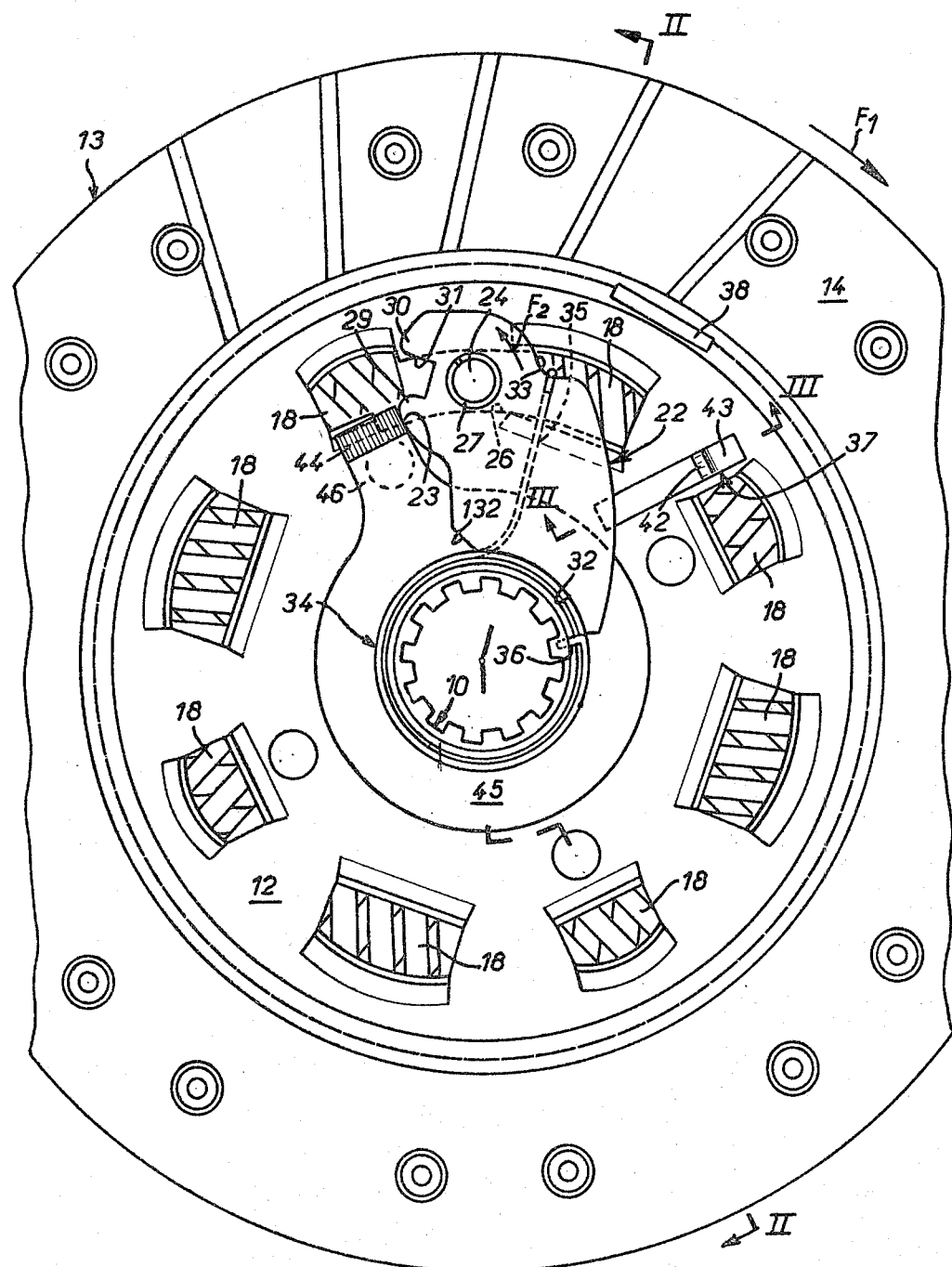
FIG. 1 is a partial view in elevation on the arrow I in FIG. 2, showing a torsional damper in accordance with the invention in the configuration it assumes when stationary.
Figure 3:
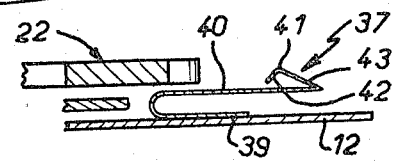
FIG. 3 is a partial transverse cross-section through the torsional damper on the line III—III in FIG. 1.

The figures constitute a general representation of the application of the invention to the construction of a friction clutch with a damper type hub.

As is known, this type of friction clutch plate comprises a hub 10, an annular disk 11 surrounding hub 10, two annular guide rings 12 extending parallel to disk 11 around hub 10 and a friction disk 13.

In the various embodiments of the invention to be described hereinafter, friction disk 13 is rigidly attached to guide rings 12 which are free to rotate around hub 10 within a defined range of relative angular movement.

It will be appreciated, however, that the invention is equally applicable to the situation, known per se, in which friction disk 13 is rigidly attached to disk 11 which is free to rotate around hub 10 within a defined range of relative angular movement, guide rings 12 being in this case rigidly attached to hub 10.

In the embodiment of the invention shown in FIGS. 1 to 7, the friction clutch plate comprises three coaxial parts mounted so as to rotate relative to one another in pairs within a defined range of relative angular movement, elastic means between said parts acting circumferentially over at least part of the aforementioned defined range of relative angular movement so as to resist same.

A friction clutch plate of this type is described in detail in French Patent Application No. 73 31172 filed Aug. 29, 1973 and published under Publication No. 2 242 606, and in the Application for Patent of Addition thereto No. 74 12915 filed Apr. 12, 1974 and published under Publication No. 2 270 491.

The friction clutch plate as such does not constitute part of the present invention, and so will not be described in detail herein. Only those parts of the friction clutch plate necessary to an understanding of the invention will be referred to hereinafter.

Briefly, the friction clutch plate comprises a first rotatable part consisting of the hub 10, a second rotatable part consisting of the disk 11, which is a component separate to hub 10, engagement means 15 with circumferential play being provided between it and the hub (FIG. 4), and a third rotatable part formed by the guide rings 12 and the friction disk 13 which, in the usual manner, carries friction linings 14 around each side of its perimeter.

The circumferentially acting elastic means associated with the first and second rotatable parts referred to hereinabove are involved in the action of said engagement means 15, within the range of relative angular movement permitted by the two teeth constituting same (see below). These elastic means consist in one or more springs 16 of relatively low stiffness, extending in a substantially tangential direction relative to a circumference of the damper assembly, bearing on hub 10 and on disk 11, in line with openings formed by cut-away portions provided for this purpose in said teeth, these springs 16 forming part of a first stage damper.

In the idle position shown in FIG. 4 there is circumferential play between the two teeth forming engagement means 15, to each side thereof and with respective values J1 and J2, together defining the permitted range of relative angular movement between the relevant rotatable parts.

In the embodiment shown, angular play J1 corresponds to operation of the clutch with increasing torque, for which it is assumed that the direction of rotation of friction disk 13 and thus that of disk 11 is as shown by the arrow F1 in FIG. 1 and FIG. 4, and exceeds angular play J2 corresponding to operation with decreasing torque. This is not mandatory, however.

The circumferentially acting elastic means between the second and third rotatable parts specified hereinabove are disposed between disk 11 and guide rings 12. These elastic means comprise springs 18, of relatively high stiffness, extending in a substantially tangential direction to a circumference of the damper assembly. Each is housed partially in a window 19 in disk 11 and partially in a window 20 in each guide ring 12, these springs 18 forming part of a second stage damper.

As described in detail in the aforementioned French Patents, for at least some of springs 18 the circumferential extent of windows 19 in disk 11 is different to that of windows 20 in guide rings 12, so that the action of these springs 18 is therefore retarded. For example, and as in the embodiment shown, springs 18 may be distributed in three separate groups, the action of these groups of springs being staggered during relative angular movement between guide rings 12 and disk 11 such that only a first of these groups of springs acts at the beginning of this relative angular movement, to be joined by the second and then the third group.

Figure 6:
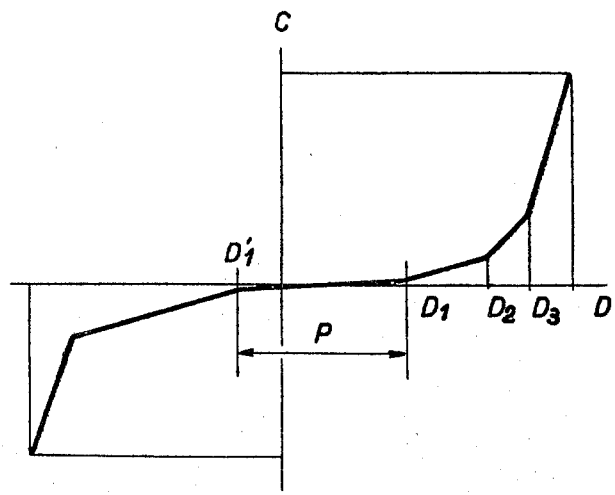
FIGS. 6 and 7 are diagrams illustrating the operation of the torsional damper in accordance with the invention.

The diagram in FIG. 6 plots the relative angular movement D along the abscissae as a function of the torque C along the ordinates. It illustrates the operation of the friction clutch with damper type hub described hereinabove when torque is applied to friction disk 13, in the direction of arrow F1 in FIG. 1.

For low values of this torque, as at the dead point with the vehicle stationary, only springs 16 of of the first stage damper act, to eliminate the corresponding dead point noise.

For operation with increasing torque, as soon as the torque begins to increase the first stage damper is saturated and, through engagement means 15 with angular play J1 absorbed, disk 11 enters into direct driving engagement with hub 10, for a value D1 of relative angular movement corresponding to this angular play J1.

The first group of springs 18 then comes into action, followed by the second and third groups, successively, for values D2 and D3, to the point at which the second stage damper formed by these three groups of springs saturates.

The process on operation with decreasing torque is analogous, except that in the embodiment shown the second and third groups of springs 18 come into action simultaneously. There is no reason why they should not do so successively, as previously described, however.

Thus springs 16 of the first stage damper act over a range P, extending from relative angular movement D1 with increasing torque to relative angular movement D'1 with decreasing torque, in which dead point noise is filtered.

To simplify the diagram in FIG. 6 no account has been taken of the hysteresis which develops due to internal friction in the clutch mechanism.

As described in the aforementioned French Patent Application No. 79 04719, this type of friction clutch plate with damper type hub comprises at least two coaxial parts mounted to rotate relative to one another within a defined range of relative angular movement, elastic means between said parts acting circumferentially over at least part of said defined range of relative angular movement so as to resist same. It incorporates at least one intermediate member responsive to centrifugal force by modifying the operating characteristics of the damper over at least part of said range of relative angular movement through its reversible movement against the action of return means between a standby position, which it occupies at relatively low rotational speeds of the damper assembly, and at least one operative position, which it occupies at relatively high rotational speeds of the damper assembly.

In practice, in the friction clutch plate shown in FIGS. 1 to 5, it is a question of acting on springs 16 of relatively low stiffness for a part of the relative angular movement between the first part, hub 10, and the second part, disk 11, of the friction clutch plate.

The intermediate member 22 in the embodiment of the invention shown is adapted to disable springs 16.

To this end it is mounted rotatably on one of the rotatable parts, the other of which is formed with an axial shoulder 23 capable of entering into positive circumferential bearing engagement with it.

In accordance with the invention, in the rest position as shown in FIG. 1 intermediate member 22 is in positive circumferential bearing engagement with the associated axial shoulder 23 so that, in this standby position of intermediate member 22, springs 16 of relatively low stiffness are disabled, as will be explained further below.

In the embodiment shown intermediate member 22 is mounted rotatably on that part of the friction clutch plate which forms disk 11, whereas axial shoulder 23 associated therewith is rigidly attached to the other part of the friction clutch plate, which forms hub 10.

In this embodiment, intermediate member 22 comprises an appropriately shaped plate mounted so as to rotate on a pin 24 which extends axially and is mounted on disk 11, being welded thereto, for example. It passes with play through an opening 25 in friction disk 13 and a slot 26 in guide ring 12 which is in back-to-back relation therewith, slot 16 linking two consecutive windows 20 in guide ring 12.

A resilient split ring 27 maintains intermediate member 22 in position in the axial direction, on pin 24 which supports it.

For positive circumferential bearing engagement with the associated axial shoulder 23, in the embodiment shown intermediate member 22 comprises two bosses 29, 30, one on each side of a notch 31.

At one end it has a rounded edge 32 which is designed to come into bearing engagement with the perimeter of hub 10 to define its retracted or standby position, as shown in FIG. 1. Thus in this respect hub 10 acts as a first fixed stop for intermediate member 22. In line with pin 24 this rounded edge 32 is delimited by a chamfer 132 to permit it to disengage from hub 10 on rotating around pin 24.

On a back section of intermediate member 22 is a saddle-shaped area 33 to permit the attachment of a spring 34 constituting the aforementioned return means.

Spring 34 is a torsion spring, the central portion of which surrounds hub 10 and one end of which extends to form a quasirectilinear section 35 which hooks over the saddle-shaped area 33 on intermediate member 22. Its other end 36 is bent at right angles and engaged in a bore formed for this purpose in hub 10.

Thus it will be seen that branch 35 of spring 34 is spaced from pin 24 of intermediate member 22 so that, in the embodiment shown, the latter is continuously subjected to a return force urging it towards its standby position as defined above.

On the path of rotation of intermediate member 22 around pin 24 in the embodiment shown is a retractable stop 37 for temporarily retaining said intermediate member so that it may occupy either of two alternative operative positions, one of which is an intermediate position (FIG. 4) in which its back section is in contact with retractable stop 37, and the other of which is a terminal position beyond the retractable stop (FIG. 5), in which its back portion bears against a fixed stop 38 formed, for example, by an axial lug attached to friction disk 13.

In the embodiment shown, retractable stop 37 comprises a leaf spring bent to form a U-shape, one branch 39 of which is attached to guide ring 12 on the side thereof on which intermediate member 22 is located, the other branch 40 of the U-shape being shaped to form an asymmetrical V-shape 41, branch 42 of which extends generally towards the axis of the damper assembly and is more steeply inclined than the other branch 43.

In the embodiment shown, the axial shoulder 23 associated with intermediate member 22 is formed by the edge of a lug 44 disposed axially at the end of an arm 46 which has a radial flange 45 rigidly attached to hub 10.

In the embodiment shown, flange 45 is attached to hub 10 by crimping, this method being known per se and therefore not described in detail herein.

In the embodiment shown, flange 45 extends transversely between guide ring 12 on the side of intermediate member 22 and intermediate member 22 itself.

As mentioned above, in the standby position of intermediate member 22 (FIG. 1) boss 29 thereon is in positive circumferential bearing engagement with axial shoulder 23 associated therewith, so that springs 16 of relatively low stiffness are disabled. Disk 11 is then in positive circumferential bearing engagement with hub 10, through intermediate member 22 and flange 45 for a first direction of rotation, and through engagement means 15 in the opposite direction of rotation, the aforementioned play J1 having been absorbed.

Intermediate member 22 thus modifies the operating characteristics of the damper, being resiliently maintained in its standby position by spring 34, which is coupled to it.

This applies throughout a first range of rotational speeds of the damper assembly, from zero speed to a value of the rotational speed conditioned by spring 45. This may be of the order of 500 to 600 revolutions per minute, for example.

Figure 7:
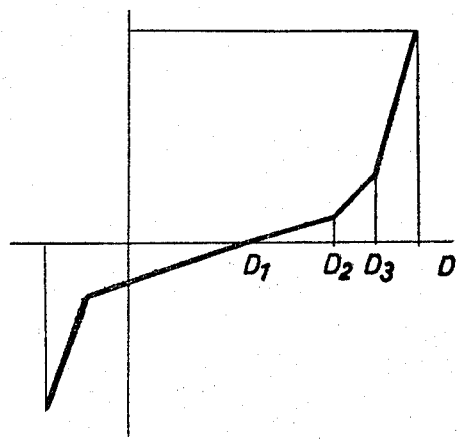

For this first range of rotational speeds of the damper assembly, operation of the friction clutch plate is as represented by the diagram in FIG. 7, with the range in which dead point noise is filtered eliminated. On a change from operation with increasing torque to operation with decreasing torque it is as if the friction clutch comprised only two coaxial parts mounted to rotate relative to one another against the action of springs 18, namely disk 11 and the part formed by guide rings 12 and friction disk 13. Disk 11 is in positive circumferential bearing engagement with hub 10 through intermediate member 22 and axial shoulder 23 associated therewith, there being no possibility of any action being exerted by springs 16 of relatively low stiffness.

If the speed of rotation of the damper assembly increases, intermediate member 22 pivots around pin 24 due to the effects of centrifugal force, as shown by the arrow F2 in FIG. 1.

As soon as it has moved sufficiently, boss 29 moves off the associated axial shoulder 23 and so releases flange 45, notch 31 being circumferentially aligned with axial shoulder 23 so that axial lug 44 on which the shoulder is formed can rotate freely, due to the presence of notch 31.

Intermediate member 22 is temporarily retained by retractable stop 37, this continuing throughout a range of rotational speeds of the damper assembly extending, for example, from the aforementioned 500 to 600 revolutions per minute to a value of the order of 1 100 revolutions per minute.

This second range of rotational speeds of the damper assembly corresponds to the idling speed of the motor of the vehicle. In it, springs 16 of relatively low stiffness are able to act to their full capacity, flange 45 carrying axial shoulder 23 and thus hub 10 which is rigidly attached to flange 45 then being released from engagement with disk 11.

The diagram representing operation of the friction clutch in accordance with the invention is then that in FIG. 6, with a range P in which dead point noise is filtered, as already described in detail hereinabove.

Thus in accordance with the invention and due to retractable stop 37 intermediate member 22 occupies, for this second range of rotational speeds of the damper assembly, an intermediate operative position in which springs 16 of relatively low stiffness are free to act.

For higher rotational speeds of the damper assembly intermediate member 22 moves past retractable stop 37, which retracts elastically, until it comes into bearing engagement with fixed stop 38 (FIG. 5).

For this second or terminal operative position of intermediate member 22 boss 30 is circumferentially aligned with axial shoulder 23, so that on changeover from operation with increasing torque to operation with decreasing torque it comes into positive circumferential bearing engagement with axial shoulder 23, so that springs 16 of relatively low stiffness are again disabled. The diagram representing the operation of the friction clutch in accordance with the invention is then again that in FIG. 7.

This situation corresponds to a third range of rotational speeds of the damper assembly, extending from the aforementioned 1 100 revolutions per minute, given by way of example.

It will be appreciated that stop 38 is of sufficient circumferential extent to provide a bearing surface for intermediate member 22 throughout the corresponding portion of the permitted range of relative angular movement, where necessary to the final value thereof.

When the rotational speed of the damper assembly decreases, under the action of spring 34 intermediate member 22 occupies successive positions corresponding to the centrifugal force to which it is subjected, possibly returning to its retracted or standby position, without retractable stop 37 causing any significant halt in such movement, by virtue of the relatively shallow slope of branch 43 of its V-shaped portion 41, which is that effective during this return movement of intermediate member 22.

Figure 9:
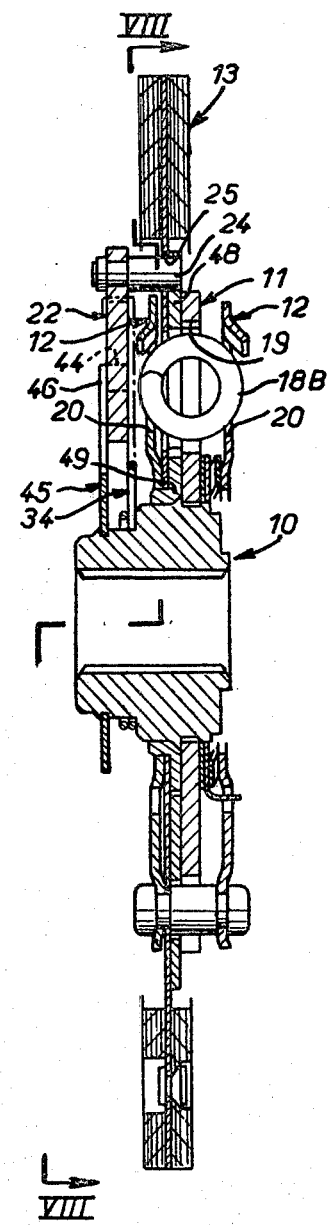
FIG. 9 is an axial cross-section on the line IX—IX in FIG. 8.
Figure 8:
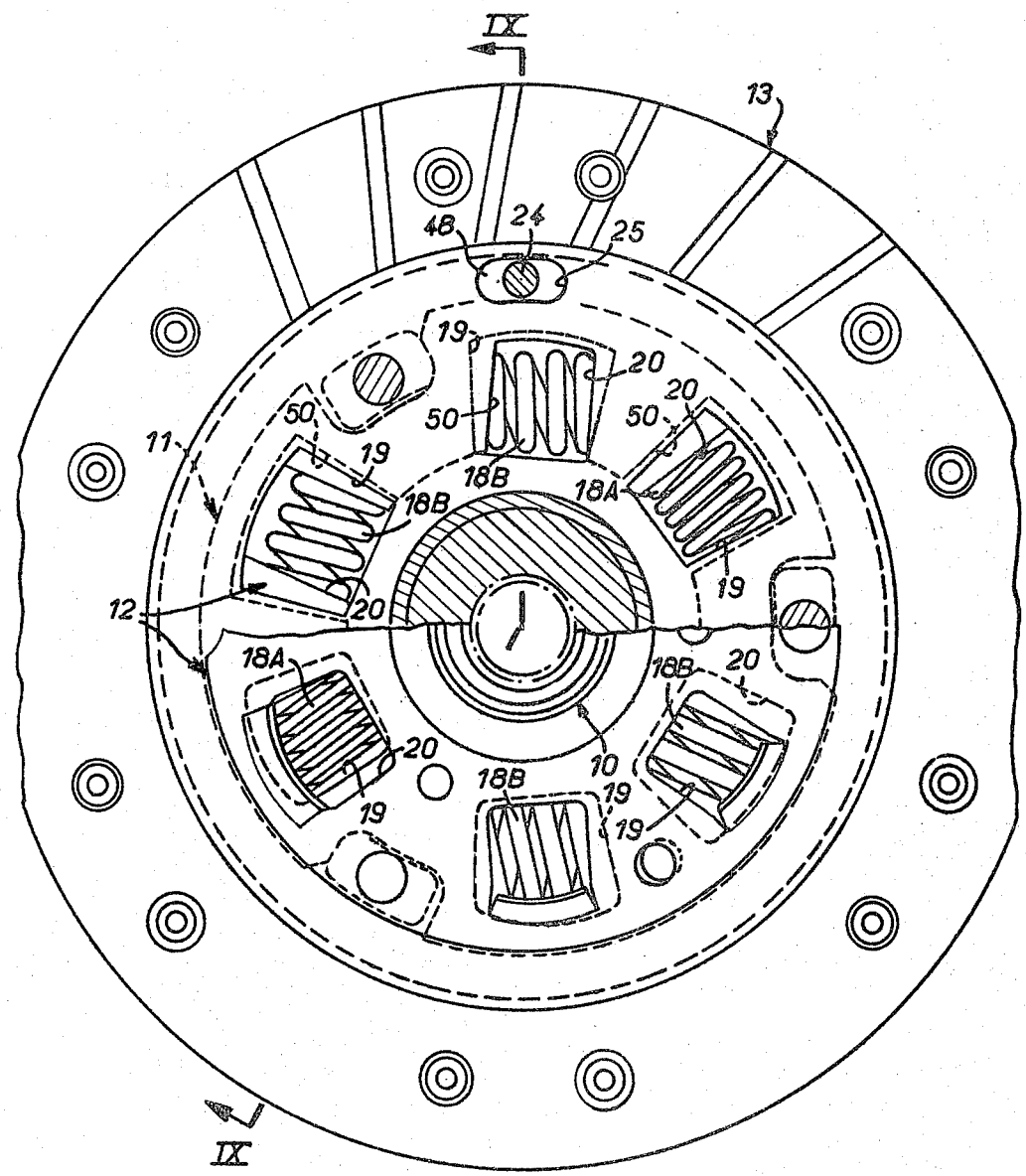
FIG. 8 is an elevation in cross-section on the line VIII—VIII in FIG. 9 showing another embodiment of the torsional damper in accordance with the invention.

FIGS. 8 and 9 show the application of the inventin to a friction clutch plate with only two rotating parts capable of relative angular movement, the disk 11 being positively attached to the hub 10 so as to rotate therewith, by a method known per se, such as crimping, for example.

This type of friction clutch plate is described in French Patent Application No. 74 14147 filed Apr. 24, 1974 and published under Publication No. 2 268 994 and in the Application Patent of Addition thereto No. 74 28507 filed Aug. 20, 1974 and published under Publication No. 2 282 577.

The friction clutch plate as such does not constitute part of the present invention, and will therefore not be described in detail.

It is sufficient to indicate that, in this type of friction clutch, the first group of springs 18 to act between guide rings 12 and disk 11 comprises two springs 18A, mounted in opposition at diametrically opposed positions, one spring 18A being compressed as the other is extended and vice versa, according to the direction of rotation.

These opposed springs 18A constitute the circumferentially acting means of relatively low stiffness between the first rotatable part, comprising hub 10 and disk 11, and the second rotatable part, comprising guide rings 12 and friction disk 13.

The other springs 18 have a stiffness which is considerably greater than that of the opposed springs 18A and, in the embodiment shown, form a second group of springs, which may be divided into sub-groups so as to intervene progressively during relative angular movement between the two coaxial parts in question. These springs are all indicated by the general reference numeral 18B in the figures.

In accordance with the invention, an intermediate member 22 as previously described is incorporated into this type of friction clutch plate.

In the embodiment shown, pin 24 on which intermediate member 22 is rotatably mounted is disposed radially beyond guide rings 12, being supported on a transverse flange 48 disposed axially between disk 11 and friction disk 13, in line with the radial part of the bearing 49 usually inserted between friction disk 13 and guide ring 12 in back-to-back relation therewith, on the one hand, and hub 10, on the other hand.

For the rest configuration of the damper assembly, as shown in FIG. 8, flange 48 is engaged without play on at least some of springs 18B, being formed with housings in the form of windows or notches to permit such engagement.

In the embodiment shown, these housings consist in notches 50 opening into the internal perimeter of flange 48.

For the relevant springs 18B, in practice those which are called upon to act first, notches 50 are matched to the circumferential extent of the springs so as to obtain the aforementioned engagement without play. This circumferential extent corresponds to that defined by the corresponding windows 20 in guide rings 12. These springs 18B are those disposed on the vertical line passing through the axis of the friction clutch as shown in FIG. 8.

For springs 18A and the other springs 18B, however, flange 48 is formed with notches 50 which have a greater circumferential extent than these springs, so as never to interfere therewith at either end.

In the embodiment shown, flange 45 at the end of a radial arm 46 on which is the axial lug 44 whose edge forms axial shoulder 23 associated with intermediate member 22 is rigidly attached to hub 10, as previously.

The operation of this type of friction clutch plate is analogous to that described previously with reference to FIGS. 1 to 7. When intermediate member 22 is in positive circumferential bearing engagement with axial shoulder 23 associated therewith, through one of bosses 29 and 30 and for operation with decreasing torque, and through axial shoulder 23 with that part of the friction clutch formed by hub 10 and disk 11, springs 18A of relatively low stiffness are prevented from acting alone at low values of torque.

Flange 48 carrying intermediate member 22 is also in positive circumferential bearing engagement with that part of the friction clutch formed by hub 10 and disk 11, being engaged without play on two of springs 18B of relatively high stiffness. It offers a positive circumferential bearing surface to these springs, so that the latter are obliged to act, in conjunction with springs 18A of relatively low stiffness.

The operating characteristics of the damper assembly are thus favourably modified, as previously, to eliminate the "clunk" noise and oscillation effects.

By comparison with conventional operation of the friction clutch, in the absence of intermediate member 22, amounting to the situation with the latter in its intermediate operative position, at rotational speeds between 500 and 1 100 revolutions per minute, for example, it is as if the specific geometry of the friction clutch plate, associated with the circumferential play between the driving part and the driven part, between which are disposed the aforementioned elastic means, were modified in respect of at least one of the elastic members constituting the aforementioned elastic means, and in practice for two of said elastic members in the embodiment shown.

In other words, it is as if, for the elastic means in question, the circumferential extent of the window or notch in one of the two rotatable parts in which each of the elastic units constituting said elastic means is partially housed were able to adopt two different values, one with the intermediate member operative and the other with it inoperative.

Insofar as the rotatable part of the friction clutch formed by hub 10 and disk 11 is concerned, the circumferential extent of the windows in which the first of springs 18B to come into action are partially engaged is conditioned by those of notches 50 in flange 48 when intermediate member 22 is in the standby or terminal position. It is conditioned by that of windows 19 in disk 11 when intermediate member 22 is in the intermediate position.

In the foregoing description, a single intermediate member 22 has been referred to in order to simplify the drawings and description.

In practice, it is preferable for there to be two intermediate members 22, in diametrically opposed positions, to eliminate the reaction on the shaft of the damper assembly due to the use of a single intermediate member 22.

It will be understood that various changes in the details, materials and arrangements of parts, which have been herein described and illustrated in order to explain the nature of the invention, may be made by those skilled in the art within the principle and scope of the invention as expressed in the appended claims.

For example, the parts of the friction clutch plate between which act the intermediate member and the axial shoulder associated therewith may be interchanged relative to one another.

In relation to the embodiment shown in FIGS. 1 to 7, intermediate member 22 could be mounted rotatably on a flange rigidly attached to hub 10, the associated axial shoulder then being formed on an axial lug rigidly attached to disk 11.

Also, arrangements of the type disclosed in French Patent Application No. 77 10034 filed Apr. 4, 1977, from which priority has been claimed in U.S. Pat. No. 4,212,380 granted July 15, 1980, including friction rings equipped with toothed means, may be adopted.

In at least some specific applications, friction means may be associated with the intermediate member in accordance with the invention so as to introduce a hysteresis effect into the action thereof, that is to say a delay on at least the return of the intermediate member to the standby position.

The invention is not limited to use in friction clutch plates for automotive vehicles, being applicable to all forms of torsional dampers.

In the embodiment of the invention shown in FIGS. 1 to 7, the axis of rotation of the intermediate member is at a slightly greater radius than the associated axial shoulder when in the standby and terminal positions. In operation with decreasing torque, the positive circumferential bearing engagement of the intermediate member on the axial shoulder may generate a rotational torque acting on the intermediate member, as a result of the reaction force due to its contact with the axial shoulder, and tending to cause it to escape therefrom.

It will be appreciated that the return spring associated with the intermediate member has sufficient strength to prevent its untimely escape from the associated axial shoulder.

As an alternative arrangement, the rotation axis of the intermediate member may be at substantially the same radius as the associated axial shoulder, avoiding the generation of a rotational torque on contact and thus permitting the user of a weaker return spring.

In another variant it may be at a smaller radius than the associated axial shoulder, of benefit in certain applications.

It will be further appreciated that the intermediate member in accordance with the invention could have only two stable positions, its standby position in which it modifies the operating characteristics of the damper assembly and an operative position in which it has no action. In this case another and separate intermediate member is preferably provided, to further modify the operating characteristics of the damper assembly at higher rotational speeds.

We claim:

1. A torsional damper such as a friction clutch plate, comprising at least two coaxial parts mounted to rotate relative to one another within a defined range of relative angular movement, elastic means between said parts acting circumferentially over at least part of said defined range of relative angular movement so as to resist same, at least one intermediate member responsive to centrifugal force by modifying the operating characteristics of the damper over at least part of said range of relative angular movement through its reversible movement against the action of return means between a standby position, which it occupies for a first range of relatively low rotational speeds of the damper assembly, and at least one operative position, which it occupies at relatively high rotational speeds of the damper assembly, said intermediate member modifying the operating characteristics of the damper in said standby position and having no effect thereon in the or each of said operative positions.

2. A torsional damper according to claim 1, wherein said intermediate member is rotatable and further comprising a retractable stop in the path of rotational movement of said member for temporarily retaining same so that it may occupy either of two alternative positions, one of which is an intermediate position corresponding to a second range of rotational speeds of the damper assembly higher than those of said first range and in which said intermediate member bears on said retractable stop and has no effect on the operating characteristics of the damper, and the other of which is a terminal position beyond said retractable stop corresponding to a third range of rotational speeds of the damper assembly higher than those of said second range and in which said intermediate member modifies the operating characteristics of the damper.

3. A torsional damper according to claim 2, further comprising an axially disposed shoulder providing a circumferential bearing surface for said intermediate member which includes two bosses, one on each side of a notch, via one of which it is in positive circumferential bearing engagement with said axially disposed shoulder in said standby position and via the other of which it is in positive circumferential bearing engagement with said axially disposed shoulder in said terminal position, said notch being circumferentially aligned with said axially disposed shoulder in said intermediate position.

4. A torsional damper according to claim 3, wherein said intermediate member is mounted on one of said rotatable coaxial parts and said axially disposed shoulder is formed by the edge of a lug on the other of said rotatable coaxial parts.

5. A torsional damper according to claim 2, wherein said retractable stop comprises a leaf spring part of which is formed to an asymmetrical V-shape.

6. A torsional damper according to claim 3, wherein the rotation axis of said intermediate member is substantially aligned, in the circumferential direction, with said axially disposed shoulder in at least one of said standby and terminal positions of said intermediate member.

7. A torsional damper according to claim 1, wherein one of said rotatable coaxial parts comprises a hub and said intermediate member has a rounded edge which bears on the periphery of said hub.

8. A torsional damper according to claim 1, wherein said return means associated with said intermediate member comprise a spring and said intermediate member is formed with a saddle-shaped area to which said spring is coupled.

9. A torsional damper according to claim 1, wherein one of said rotatable coaxial parts comprises a hub and the other comprises a disk, said intermediate member being rotatably mounted on said disk or on a flange rigidly attached to said hub.

10. A torsional damper according to claim 1, wherein a flange associated with said rotatable coaxial parts is engaged without play on at least some of said circumferentially acting elastic means disposed between said rotatable coaxial parts, and said intermediate member is rotatably mounted on said flange or one one of said parts.

* * * * *